(12) United States Patent
Kim et al.

(10) Patent No.: US 9,981,645 B2
(45) Date of Patent: May 29, 2018

(54) ELECTRIC BRAKE SYSTEM

(71) Applicant: MANDO CORPORATION, Gyeonggi-do (KR)

(72) Inventors: Hyun-Ho Kim, Gyeonggi-do (KR); In-Wook Jeon, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days. days.

(21) Appl. No.: 15/298,163

(22) Filed: Oct. 19, 2016

(65) Prior Publication Data

US 2017/0106846 A1 Apr. 20, 2017

(30) Foreign Application Priority Data

Oct. 19, 2015 (KR) ........................ 10-2015-0145163

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/348* (2013.01); *B60T 8/4081* (2013.01);
(Continued)

(58) Field of Classification Search
CPC ...... B60T 13/66; B60T 13/662; B60T 13/686; B60T 8/348; B60T 8/4081; B60T 13/146;
(Continued)

(56) References Cited

U.S. PATENT DOCUMENTS

2002/0084691 A1* 7/2002 Isono .................... B60T 8/4081
303/10
2012/0169112 A1* 7/2012 Jungbecker ........... B60T 8/4081
303/9.75
(Continued)

FOREIGN PATENT DOCUMENTS

DE 102011080312 A1 * 2/2012 ............ B60T 8/4018
EP 2 520 473 11/2012
(Continued)

OTHER PUBLICATIONS

EPO translation, DE 10 2011 080 312 A1, Jungbecker et al., Feb. 2012.*

*Primary Examiner* — Thomas J Williams
(74) *Attorney, Agent, or Firm* — Ladas & Parry, LLP

(57) ABSTRACT

An electric brake system is disclosed. The electric brake system comprises a hydraulic pressure supply device configured to generate hydraulic pressure using a hydraulic piston which is activated by means of an electrical signal that is output corresponding to a displacement of a brake pedal, and including a cylinder block, first and second hydraulic pistons movably accommodated inside the cylinder block, and first and second pressure chambers comparted by the first and second hydraulic pistons, a first hydraulic circuit configured to connect a first hydraulic flow path communicating with the first pressure chamber to one or more wheel cylinders, a second hydraulic circuit configured to connect a second hydraulic flow path communicating with the second pressure chamber to one or more wheel cylinders, and a balance valve configured to open and close a balance flow path connecting the first hydraulic flow path to the second hydraulic flow path.

17 Claims, 10 Drawing Sheets

(51) Int. Cl.
  *B60T 8/40* (2006.01)
  *B60T 8/34* (2006.01)
  *B60T 11/232* (2006.01)
  *B60T 11/236* (2006.01)
  *B60T 13/14* (2006.01)
  *B60T 13/66* (2006.01)
  *B60T 13/74* (2006.01)

(52) U.S. Cl.
  CPC .......... *B60T 11/232* (2013.01); *B60T 11/236* (2013.01); *B60T 13/146* (2013.01); *B60T 13/662* (2013.01); *B60T 13/745* (2013.01); *B60T 2270/82* (2013.01)

(58) Field of Classification Search
  CPC .... B60T 13/745; B60T 11/236; B60T 11/232; B60T 2270/82
  USPC .......................................................... 303/20
  See application file for complete search history.

(56) References Cited

U.S. PATENT DOCUMENTS

| | | | | |
|---|---|---|---|---|
| 2013/0127237 | A1* | 5/2013 | Pfeiffer | B60T 8/4018 303/6.01 |
| 2013/0213025 | A1* | 8/2013 | Linden | B60T 8/4018 60/327 |
| 2013/0241276 | A1* | 9/2013 | Kim | B60T 13/142 303/9.62 |
| 2013/0307322 | A1* | 11/2013 | Kim | B60T 7/042 303/6.01 |
| 2014/0028083 | A1* | 1/2014 | Gerdes | B60T 1/10 303/6.01 |
| 2017/0106843 | A1* | 4/2017 | Jeong | B60T 8/90 |

FOREIGN PATENT DOCUMENTS

| | | | |
|---|---|---|---|
| JP | 2015-67233 | 4/2015 | |
| KR | 10-2013-0104160 | 9/2013 | |
| WO | WO-2016087506 A1 * | 6/2016 | .............. B60T 7/042 |

* cited by examiner

【Fig. 1】
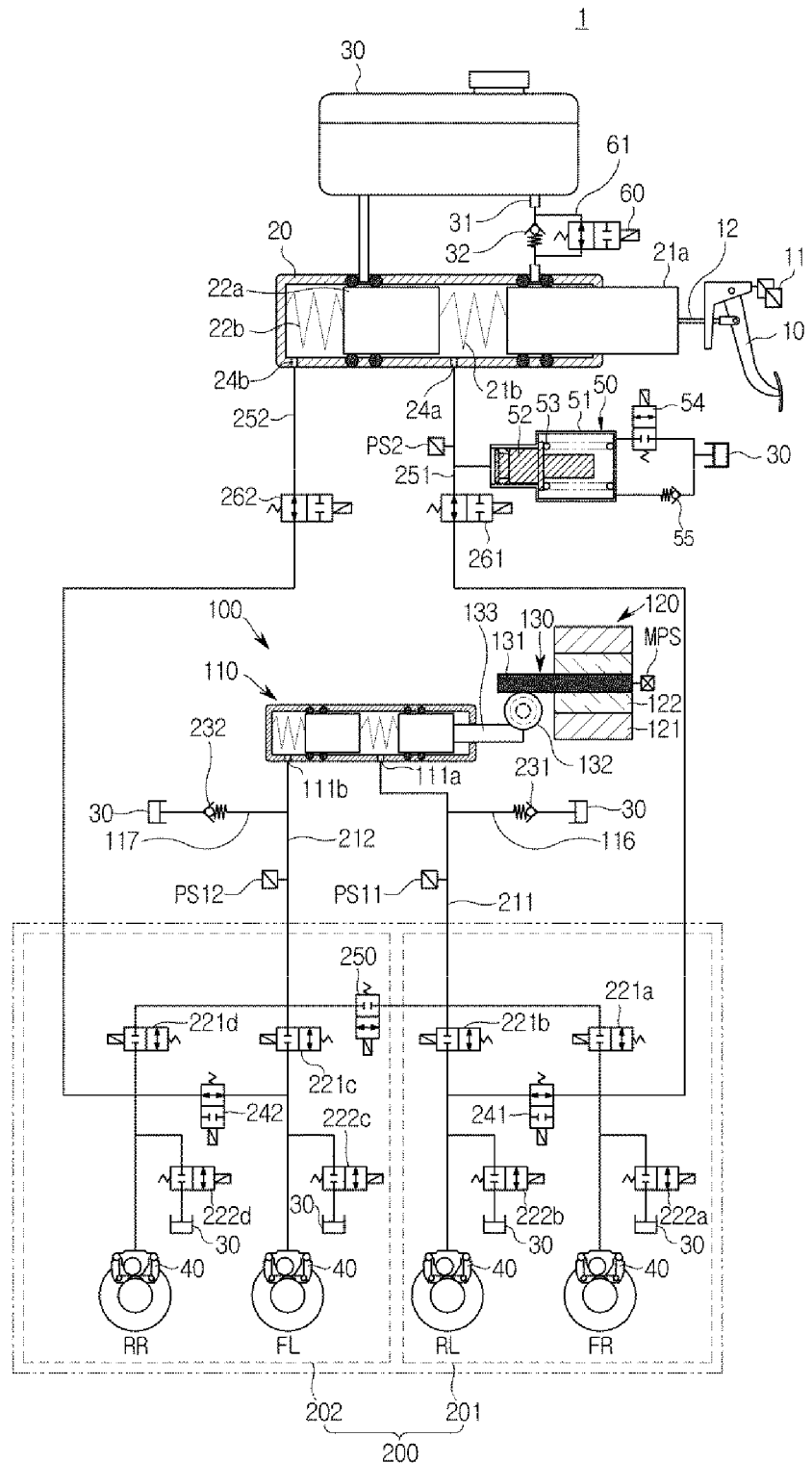

[Fig. 2]
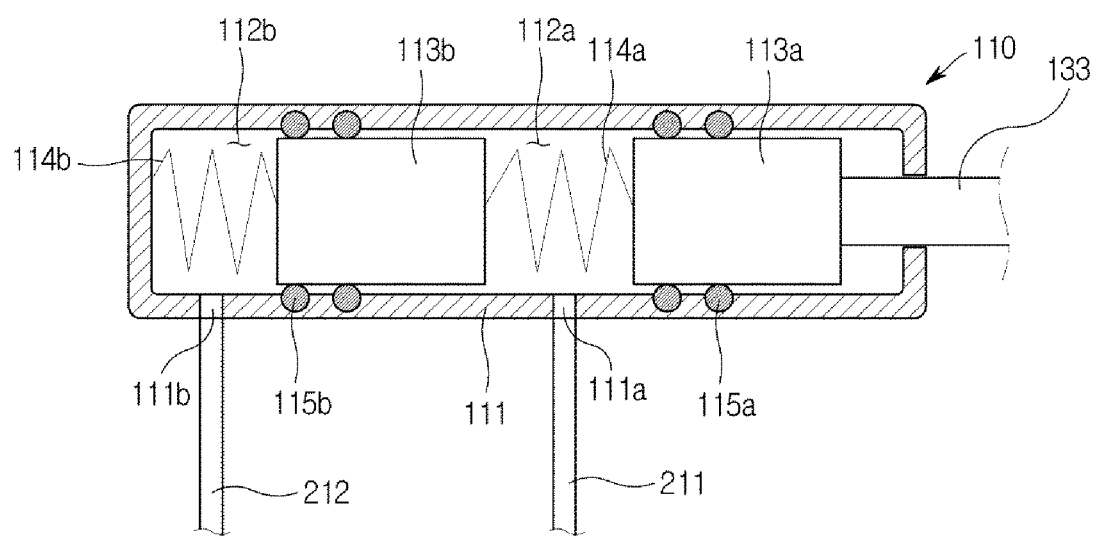

[Fig. 3]
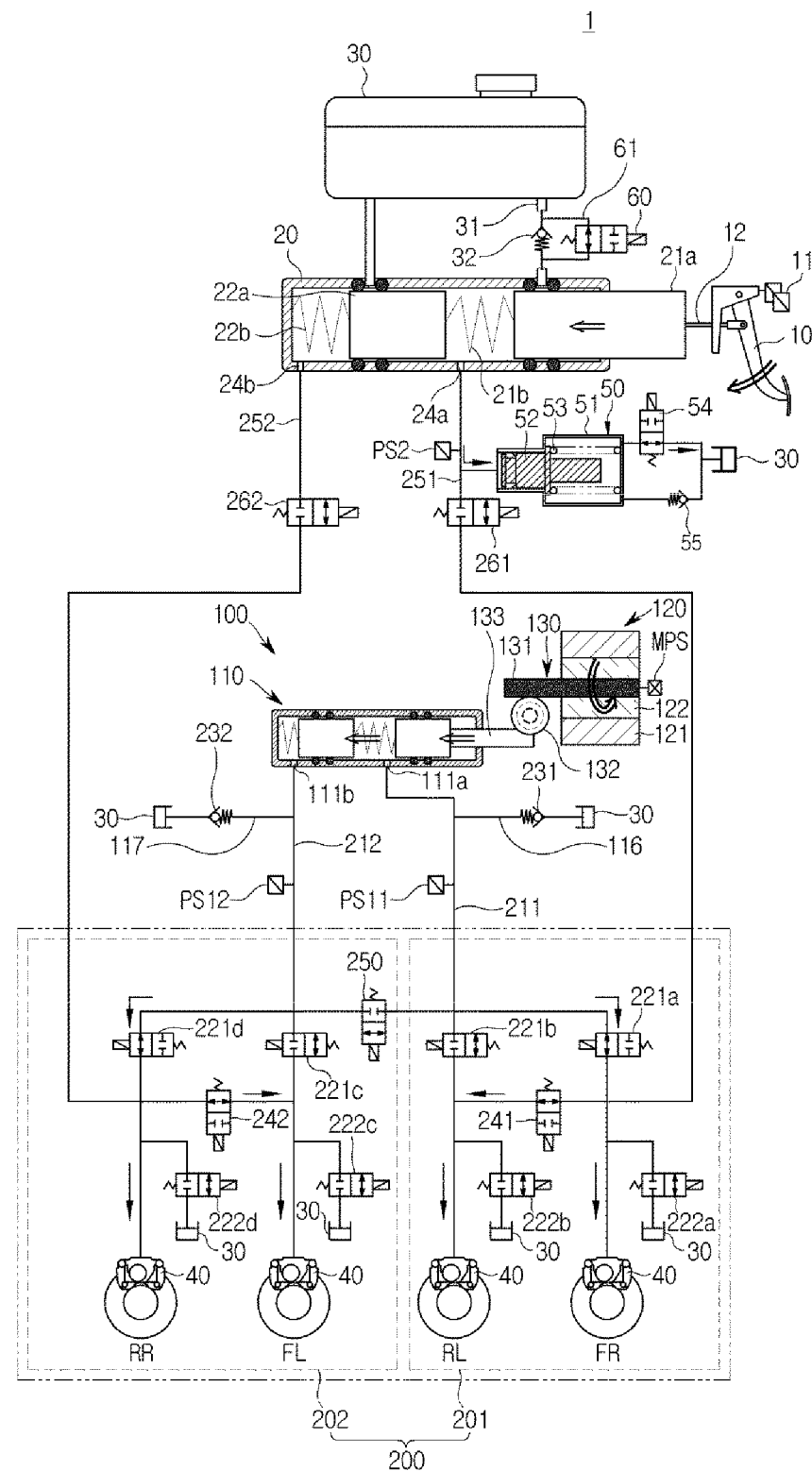

[Fig. 4]
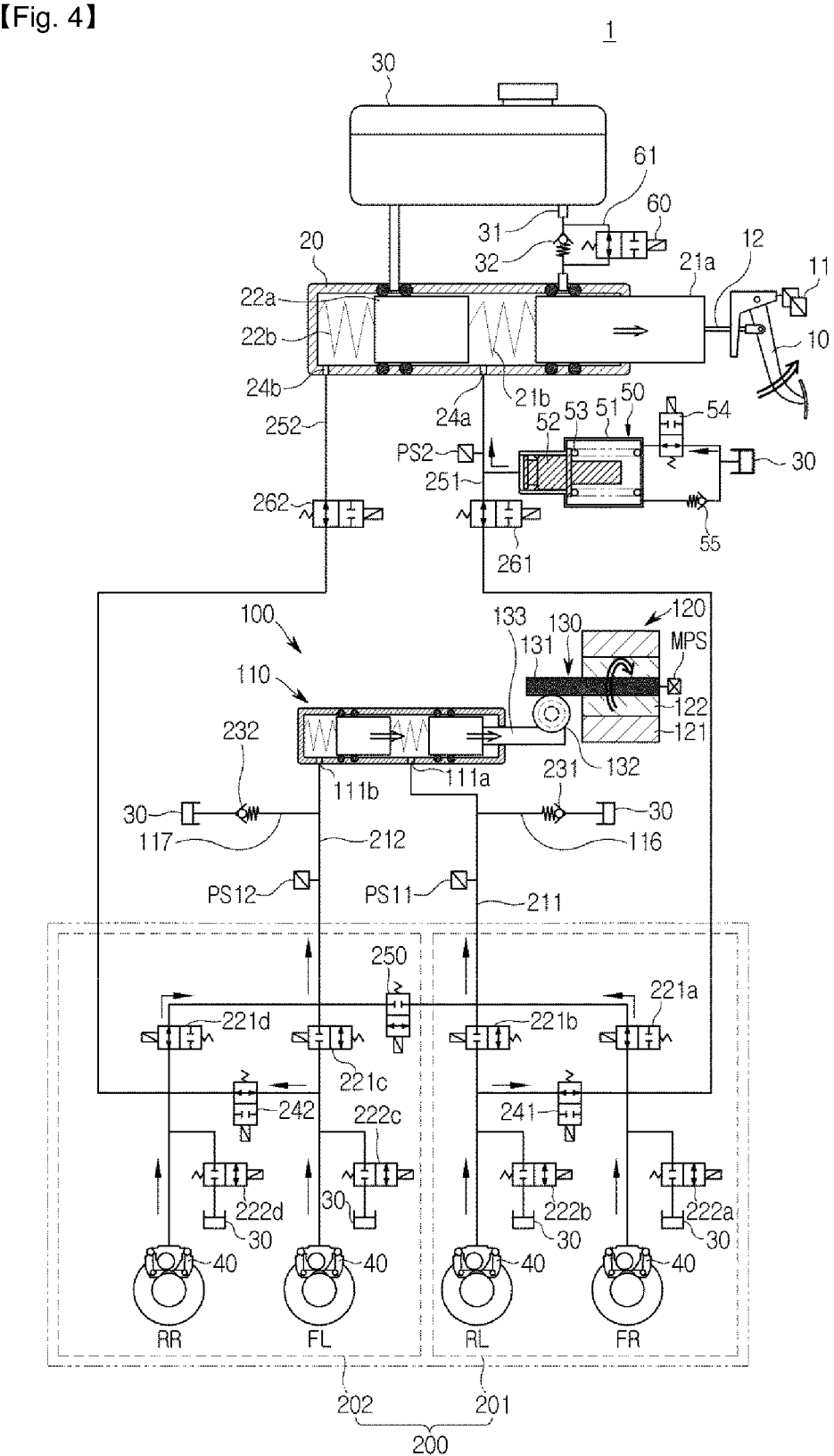

[Fig. 5]
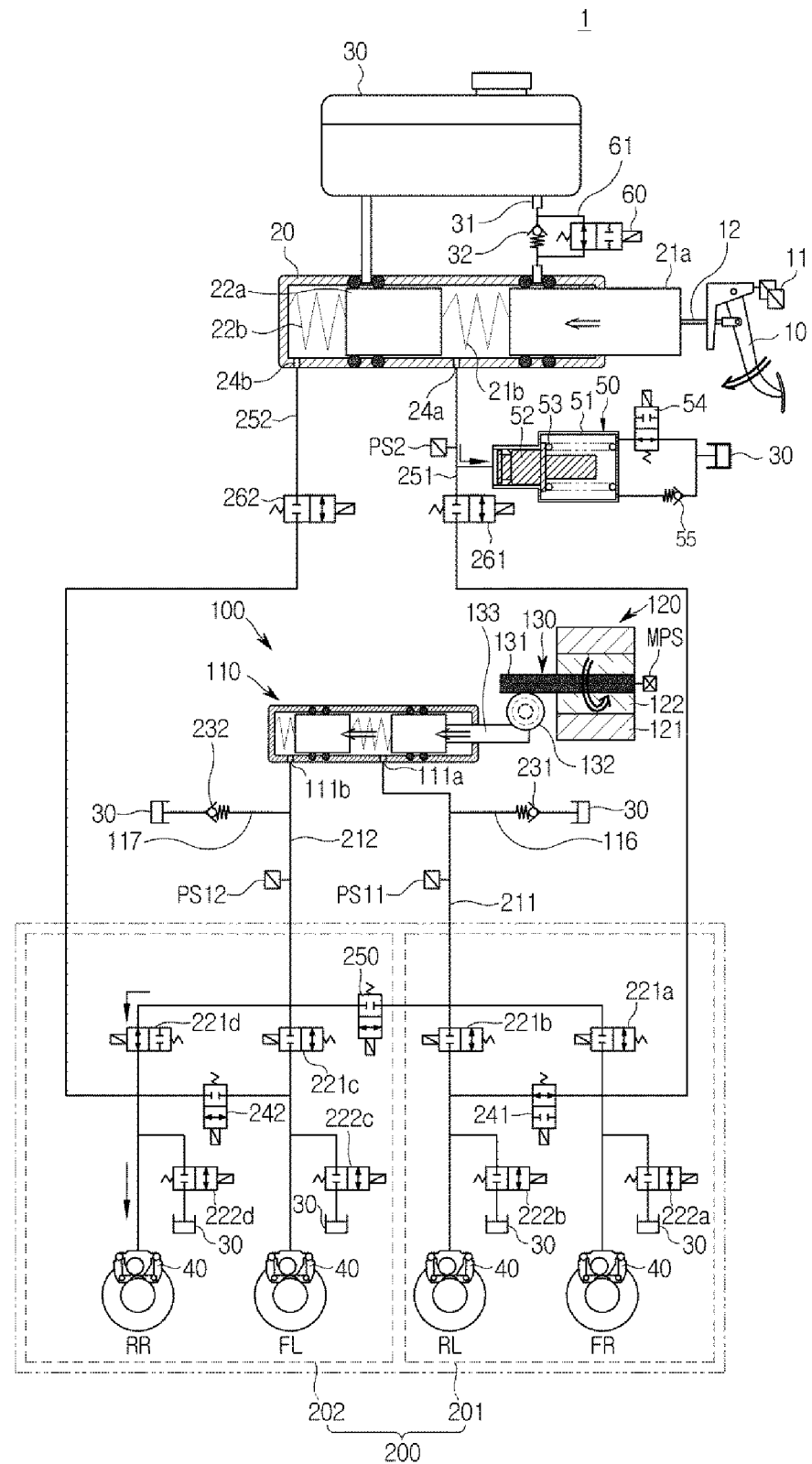

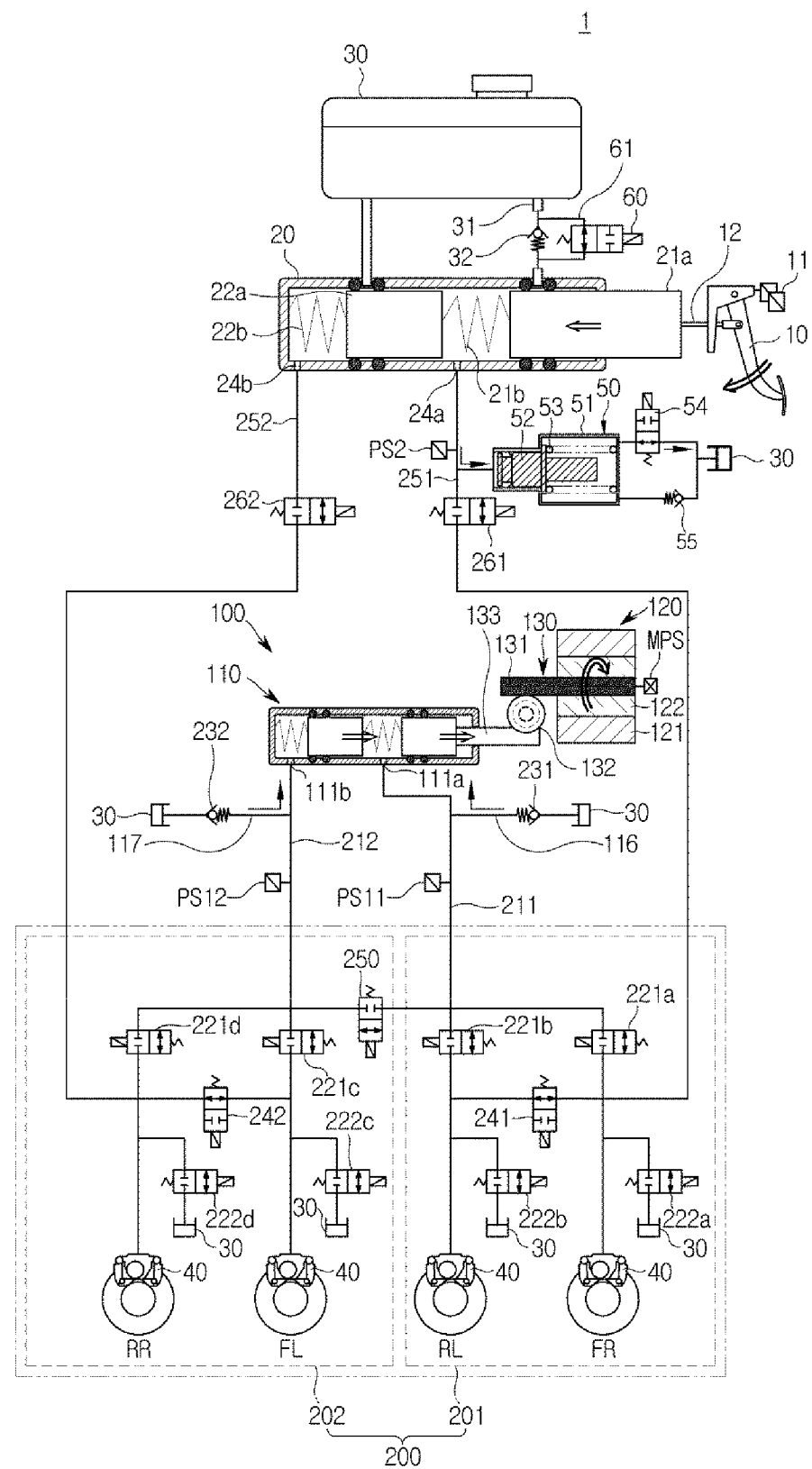
[Fig. 6]

[Fig. 7]
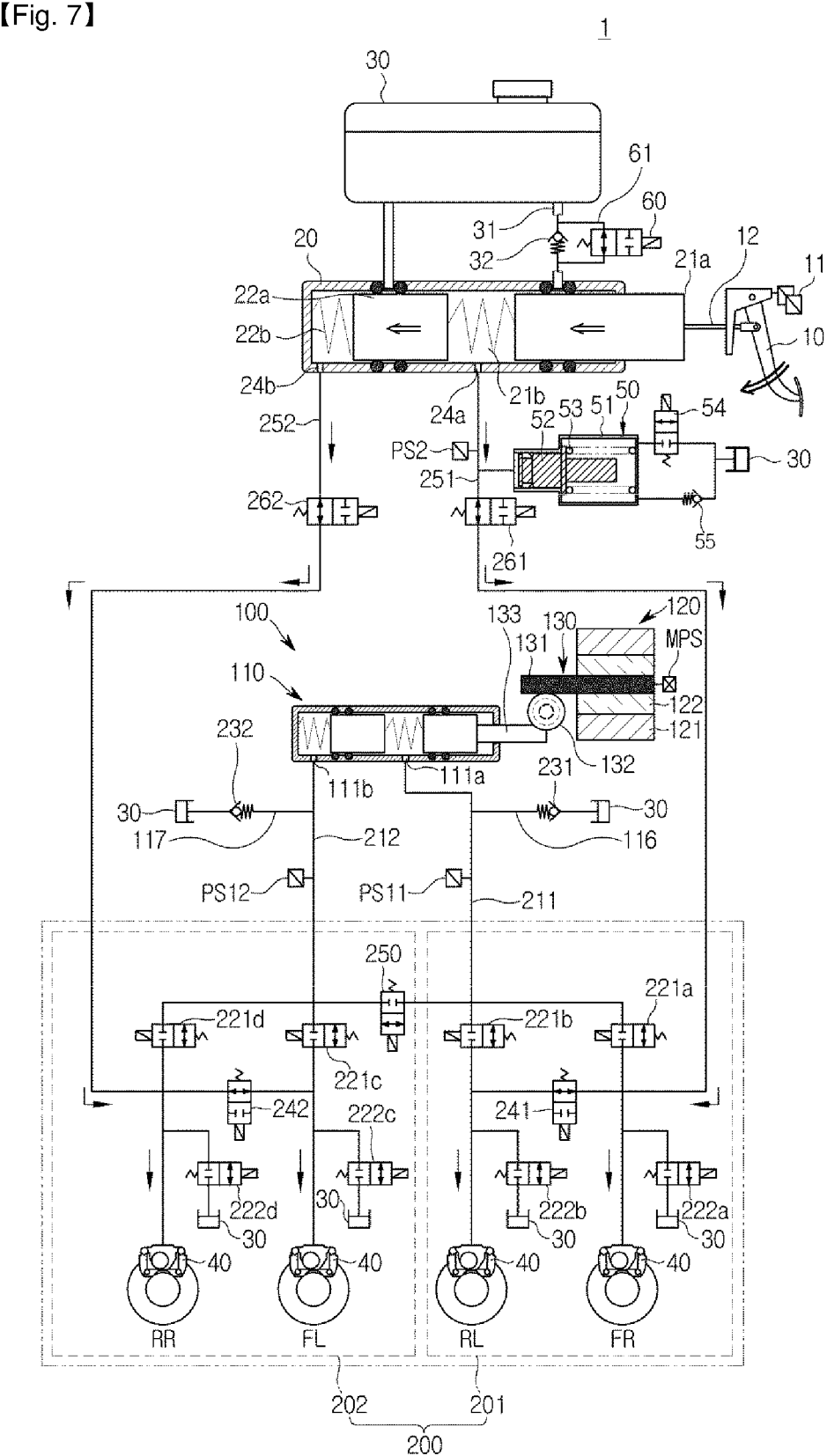

[Fig. 8]
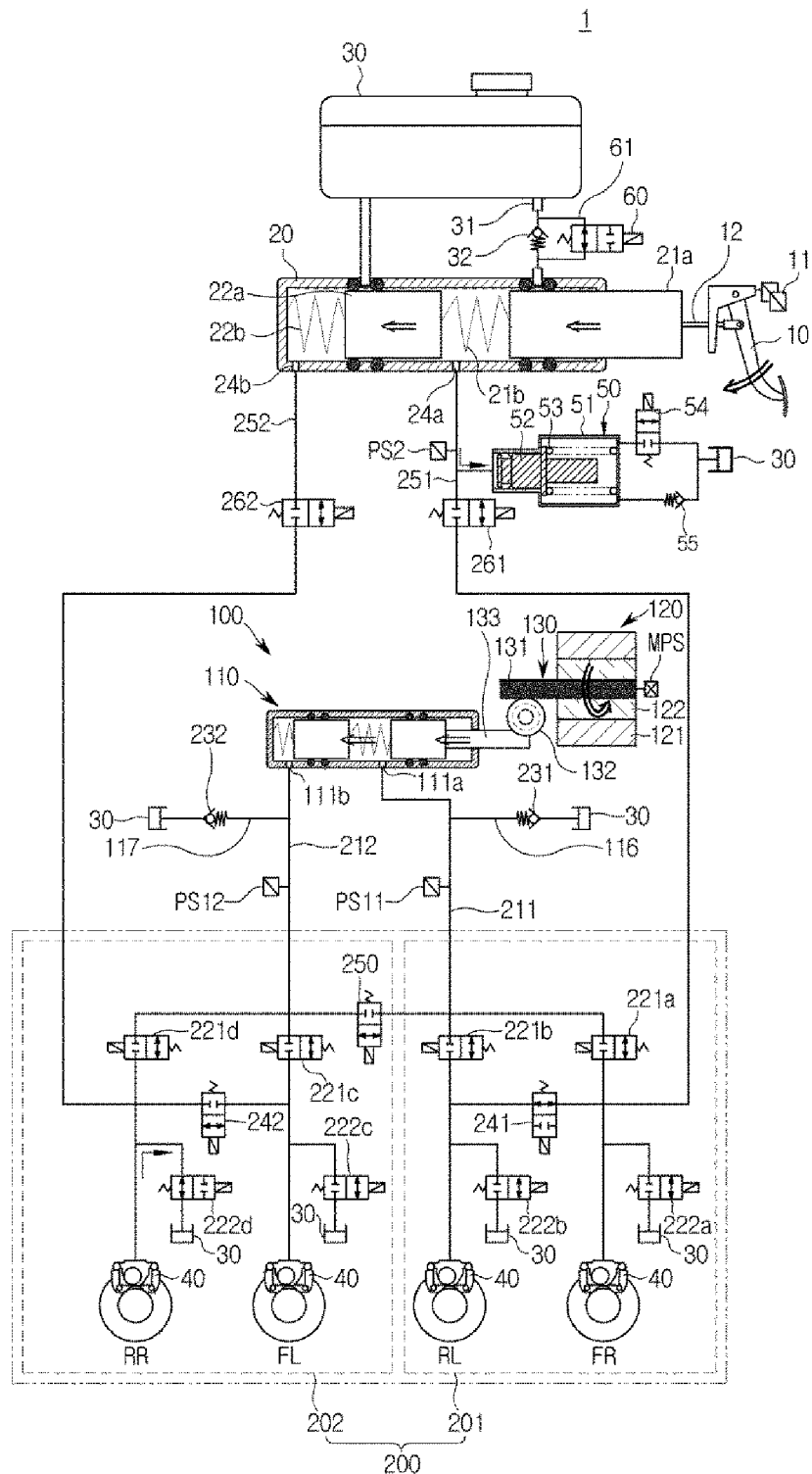

[Fig. 9]
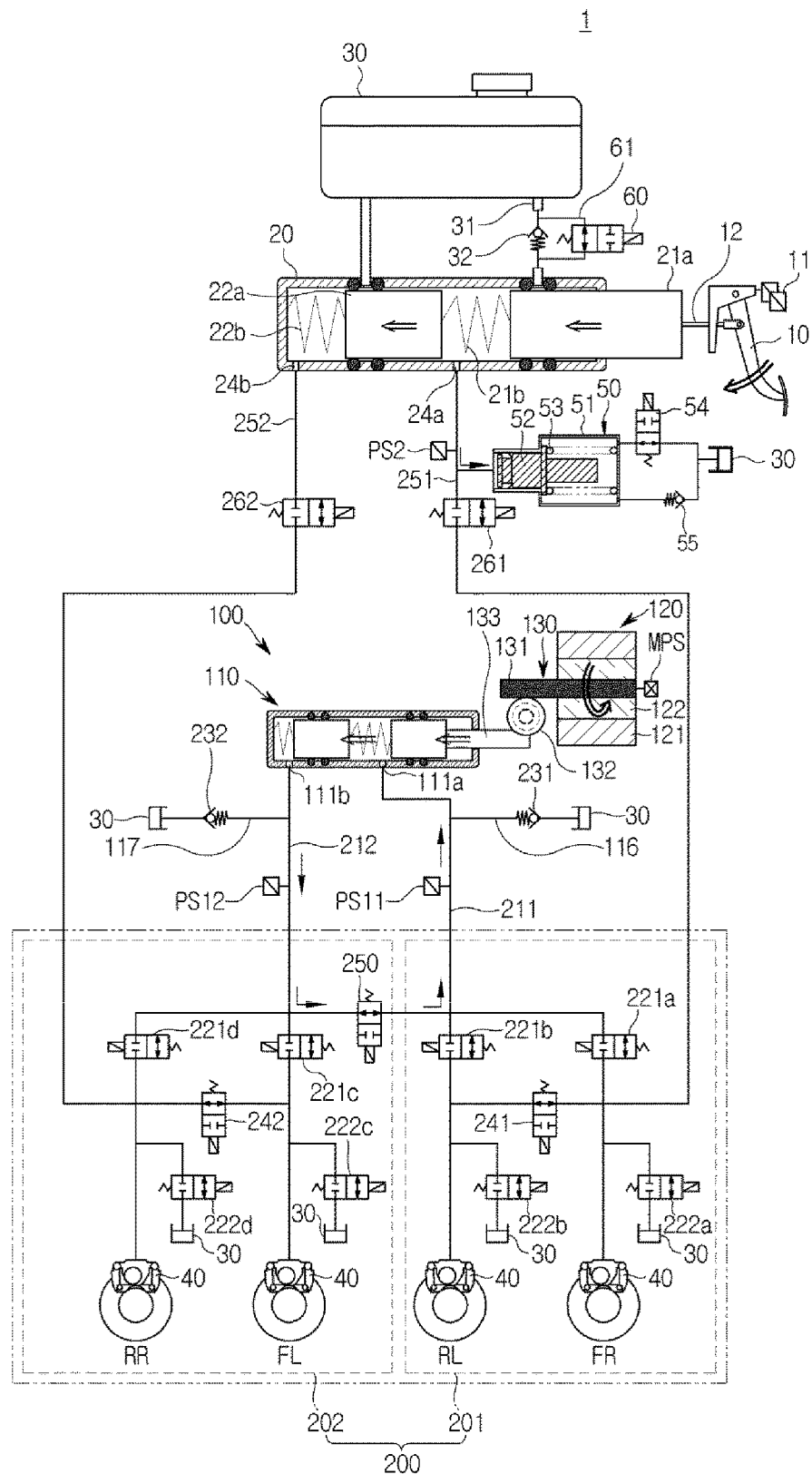

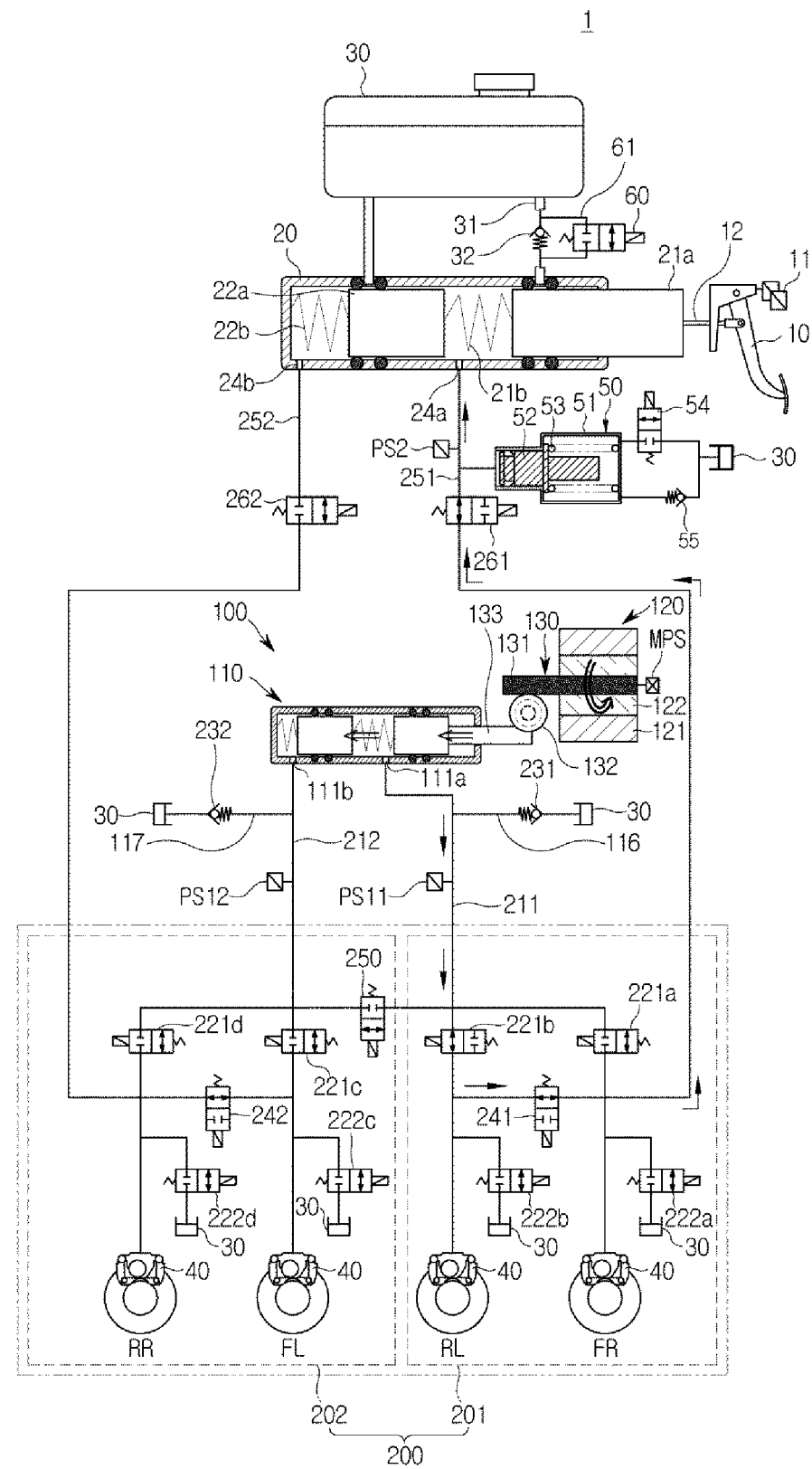
[Fig. 10]

ELECTRIC BRAKE SYSTEM

This application claims the benefit of Korean Patent Application No. 2015-0145163, filed on Oct. 19, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal.

2. Description of the Related Art

A brake system for braking is necessarily mounted on a vehicle, and a variety of systems for providing stronger and more stable braking have been proposed recently.

For example, there are brake systems including an antilock brake system (ABS) for preventing a wheel from sliding while braking, a brake traction control system (BTCS) for preventing a driving wheel from slipping when a vehicle is unintentionally rushed or intentionally accelerated, an electronic stability control system (ESC) for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

PRIOR ART DOCUMENT (Patent Document) EP 2 520 473 A1 (Honda Motor Co., Ltd.), Nov. 7, 2012.

SUMMARY

Therefore, it is an aspect of the present disclosure to provide an electric brake system including a tandem type hydraulic pressure supply device capable of balancing a plurality of chambers.

Also, it is another aspect of the present disclosure to provide an electric brake system capable of inspecting occurrence of a leak of a valve.

Additional aspects of the disclosure will be set forth in part in the description which follows and, in part, will be obvious from the description, or may be learned by practice of the disclosure.

In accordance with one aspect of the present invention, there is provided an electric brake system comprising: a hydraulic pressure supply device configured to generate hydraulic pressure using a hydraulic piston which is activated by means of an electrical signal that is output corresponding to a displacement of a brake pedal, and including a cylinder block, first and second hydraulic pistons movably accommodated inside the cylinder block, and first and second pressure chambers comparted by the first and second hydraulic pistons; a first hydraulic circuit configured to connect a first hydraulic flow path communicating with the first pressure chamber to one or more wheel cylinders; a second hydraulic circuit configured to connect a second hydraulic flow path communicating with the second pressure chamber to one or more wheel cylinders; and a balance valve configured to open and close a balance flow path connecting the first hydraulic flow path to the second hydraulic flow path.

Also, the first hydraulic circuit includes a first inlet valve configured to open and close a flow path between the first hydraulic flow path and the one or more wheel cylinders, the second hydraulic circuit includes a second inlet valve configured to open and close a flow path between the first hydraulic flow path and the one or more wheel cylinders, and the balance flow path connects the first hydraulic flow path between the first pressure chamber and the first inlet valve to the second hydraulic flow path between the second pressure chamber and the second inlet valve.

Also, the electric brake system further comprising: a first dump valve configured to open and close a first dump flow path connecting a first reservoir in which oil is accommodated to the first pressure chamber; and a second dump valve configured to open and close a second dump path connecting a second reservoir in which oil is accommodated to the second pressure chamber.

Also, the first dump valve is configured with a check valve that allows an oil flow only in a direction from the first reservoir to the first pressure chamber, and the second dump valve is configured with a check valve that allows an oil flow only in a direction from the second reservoir to the second pressure chamber.

Also, the first dump flow path branches between the first pressure chamber of the first hydraulic flow path and the balance flow path, and the second dump flow path branches between the second pressure chamber of the second hydraulic flow path and the balance flow path.

Also, at least one or more of the first hydraulic flow path and the second hydraulic flow path branch into a plurality of flow paths connected to the one or more wheel cylinders, and each of the plurality of branching flow paths include an inlet valve.

Also, the first hydraulic circuit includes the first hydraulic flow path communicating with the first pressure chamber, and first and second branching flow paths branching from the first hydraulic flow path and respectively connected to two wheel cylinders, and the second hydraulic circuit includes the second hydraulic flow path communicating with the second pressure chamber, and third and fourth branching flow paths branching from the second hydraulic flow path and respectively connected to two wheel cylinders, wherein the electric brake system further includes first to fourth inlet valves configured to open and close each of flow paths between the first to fourth branching flow paths and the wheel cylinders.

Also, the first to fourth branching flow paths which branch from the first hydraulic flow path and the second hydraulic flow path include the first to fourth inlet valves, respectively.

Also, the balance valve is a normally closed type valve that is usually closed and is opened when an opening signal is received.

Also, the electric brake system further comprising: a master cylinder connected to a reservoir in which oil is stored and configured to discharge the oil according to a pedal effort of a brake pedal; a simulation device connected to the master cylinder, provided with a simulator valve provided at a flow path connecting a simulation chamber in which oil is accommodated to the reservoir in which the oil is stored, and configured to provide a reaction force according to the pedal effort of the brake pedal; and an inspection valve configured to open and close a flow path connecting the reservoir to the master cylinder.

Also, a check valve is installed at the flow path connecting the reservoir to the master cylinder to allow an oil flow from the reservoir to the master cylinder and block the oil flow from the master cylinder to the reservoir, and the inspection valve is installed at an inspection flow path that bypasses the check valve.

Also, the simulator valve is provided to open a flow path connecting the simulation chamber to the reservoir in a normal mode, and to block the flow path connecting the simulation chamber to the reservoir in an abnormal mode, and the inspection valve is provided to block the inspection flow path in an inspection mode.

Also, the inspection valve is a normally opened type valve that is usually opened and is closed when a closing signal is received.

In accordance with other aspect of the present invention, there is provided an electric brake system comprising: a hydraulic pressure supply device configured to generate hydraulic pressure using a hydraulic piston which is activated by means of an electrical signal that is output corresponding to a displacement of a brake pedal, and including a cylinder block, first and second hydraulic pistons movably accommodated inside the cylinder block, and first and second pressure chambers comparted by the first and second hydraulic pistons; and a balance valve installed to open and close a balance flow path connecting the first pressure chamber to the second pressure chamber and configured to adjust a balance in pressure between the first pressure chamber and the second pressure chamber.

Also, the balance valve is configured with a normally closed type valve that is usually closed and is operated to be opened when an imbalance in pressure between the first pressure chamber and the second pressure chamber occurs to open the balance flow path.

Also, the electric brake system further comprising: a first hydraulic circuit configured to connect a first hydraulic flow path communicating with the first pressure chamber to one or more wheel cylinders; and a second hydraulic circuit configured to connect a second hydraulic flow path communicating with the second pressure chamber to one or more wheel cylinders, wherein the balance flow path connects the first hydraulic flow path to the second hydraulic flow path.

BRIEF DESCRIPTION OF THE DRAWINGS

FIG. 1 is a hydraulic circuit diagram illustrating a non-braking state of an electric brake system according to an embodiment of the present disclosure.

FIG. 2 is a diagram illustrating a structure of the hydraulic pressure supply device.

FIG. 3 is a hydraulic circuit diagram illustrating a state in which the electric brake system according to the embodiment of the present disclosure normally performs a braking operation.

FIG. 4 is a hydraulic circuit diagram illustrating a state in which the electric brake system according to the embodiment of the present disclosure releases braking normally.

FIG. 5 is a hydraulic circuit diagram illustrating a state in which an ABS is operated through the electric brake system according to the embodiment of the present disclosure.

FIG. 6 is a hydraulic circuit diagram illustrating a case in which the electric brake system according to the embodiment of the present disclosure supplements hydraulic pressure.

FIG. 7 is a hydraulic circuit diagram illustrating a case in which the electric brake system according to the embodiment of the present disclosure operates abnormally.

FIG. 8 is a hydraulic circuit diagram illustrating a state in which the electric brake system according to the embodiment of the present disclosure operates in a dump mode.

FIG. 9 is a hydraulic circuit diagram illustrating a state in which the electric brake system according to the embodiment of the present disclosure operates in a balance mode.

FIG. 10 is a hydraulic circuit diagram illustrating a state in which the electric brake system according to the embodiment of the present disclosure operates in an inspection mode.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to an embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers, a first piston 21a and a second piston 22a may be provided at the two chambers, respectively, and the first piston 21a and the input rod 12 may be connected to each other.

Meanwhile, the master cylinder 20 may include two chambers to secure safety when one chamber fails. For example, one of the two chambers may be connected to a front right wheel FR and a rear left wheel RL of a vehicle, and the remaining chamber may be connected to a front left wheel FL and a rear right wheel RR. Otherwise, one of the two chambers may be connected to two front wheels FR and FL and the remaining chamber may be connected to two rear wheels RR and RL. As described above, the two chambers may be independently configured so that braking of a vehicle may be possible even when one of the two chambers fails.

For this purpose, the master cylinder 20 may include first and second hydraulic ports 24a and 24b which are formed thereon and through which hydraulic pressure is discharged from each of the two chambers.

Also, a first spring 21b may be provided between the first piston 21a and the second piston 22a of the master cylinder 20, and a second spring 22b may be provided between the second piston 22a and an end of the master cylinder 20.

The first spring 21b and the second spring 22b are provided at the two chambers, respectively, to store an elastic force when the first piston 21a and the second piston 22a are compressed according to a variance of displacement of the brake pedal 10. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 pressurizing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251, which will be described below, to provide a reaction force according to the pedal effort of the brake pedal 10. A reaction force may be provided to compensate for a pedal effort provided from a driver such that a braking force may be finely controlled as intended by the driver.

Referring to FIG. 1, the simulation device 50 includes a simulation chamber 51 provided to store oil discharged from the first hydraulic port 24a of the master cylinder 20, a reaction force piston 52 provided inside the simulation chamber 51, a pedal simulator provided with a reaction force spring 53 elastically supporting the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by means of oil flowing therein.

Meanwhile, the reaction force spring 53 shown in the drawing is merely one embodiment capable of providing an elastic force to the reaction force piston 52, and thus it may include numerous embodiments capable of storing an elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting a rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, when the reaction force piston 52 returns, oil inside the reservoir 30 may flow through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. The reservoirs may be configured with the same components and may alternatively be configured with different components. As one example, the reservoir 30 connected to the simulation device 50 may be the same as the reservoir 30 connected to the master cylinder 20 or may be a storage part capable of storing oil separately from the reservoir 30 connected to the master cylinder 20.

Meanwhile, the simulator valve 54 may be configured with a normally closed type solenoid valve usually maintaining a closed state. When the driver applies a pedal effort to the brake pedal 10, the simulator valve 54 may be opened to deliver brake oil between the simulation chamber 51 and the reservoir 30.

Also, a simulator check valve 55 may be installed to be connected in parallel with the simulator valve 54 between the pedal simulator and the reservoir 30. The simulator check valve 55 may allow the oil inside the reservoir 30 to flow toward the simulation chamber 51 and may block the oil inside the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil inside the simulation chamber 51, which is pushed by the reaction force piston 52 of the pedal simulator while the reaction force piston 52 compresses the reaction force spring 53, is delivered to the reservoir 30 through the simulator valve 54, and then a pedal feeling is provided to the driver through such an operation. Further, when the driver releases the pedal effort from the brake pedal 10, the reaction force spring 53 may push the reaction force piston 52 to return the reaction force piston 52 to its original state, and the oil inside the reservoir 30 may flow into the simulation chamber 51 through the flow path at which the simulator valve 54 is installed and the flow path at which the simulator check valve 55 is installed, thereby completely filling the inside of the simulation chamber 51 with the oil.

As described above, because the inside of the simulation chamber 51 is in a state in which the oil is filled therein at all times, friction of the reaction force piston 52 is minimized when the simulation device 50 is operated, and thus durability of the simulation device 50 may be improved and also introduction of foreign materials from the outside may be blocked.

The electric brake system 1 according to the embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided at two wheels respectively, and controlling a hydraulic pressure flow delivered to the wheel cylinder 40 that is provided at each of the wheels RR, RL, FR, and FL, a first cut valve 261 provided at the first backup flow path 251 connecting the first hydraulic port 24a to the first hydraulic circuit 201 to control a hydraulic pressure flow, a second cut valve 262 provided at a second backup flow path 252 connecting the second hydraulic port 24b to the second hydraulic circuit 202 to control a hydraulic pressure flow, and an electronic control unit (ECU) (not shown) controlling the hydraulic pressure supply device 100 and valves 54, 60, 221a, 221b, 221c, 221d, 222a, 222b, 222c, 222d, 241, 242, 250, 261, and 262 on the basis of hydraulic pressure information and pedal displacement information.

FIG. 2 is a diagram illustrating a structure of the hydraulic pressure supply device 100.

Referring to FIG. 2, the hydraulic pressure supply device 100 may include a hydraulic pressure supply unit 110 providing oil pressure delivered to the wheel cylinder 40, a motor 120 generating a rotational force in response to an electrical signal of the pedal displacement sensor 11, and a power conversion unit 130 converting a rotational movement of the motor 120 into a rectilinear movement and transmitting the rectilinear movement to the hydraulic pressure supply unit 110. Also, the hydraulic pressure supply unit 110 may be operated by means of pressure provided from a high pressure accumulator instead of a driving force supplied from the motor 120.

The hydraulic pressure supply unit 110 includes a cylinder block 111 in which a pressure chamber 112 (that is, 112a and 112b) for receiving and storing oil therein is formed, a hydraulic piston 113 (that is, 113a and 113b) accommodated in the cylinder block 111, and a sealing member 115 (that is, 115a and 115b) provided between the hydraulic piston 113 and the cylinder block 111 to seal the pressure chamber 112.

The hydraulic pressure supply unit 110 may be configured to include two or more pressure chambers to generate hydraulic pressure. As one example, the hydraulic pressure supply unit 110 may be configured to include two pressure chambers 112a and 112b, a first hydraulic piston 113a may be provided at a first pressure chamber 112a, and a second hydraulic piston 113b may be provided at a second pressure chamber 112b, and the first hydraulic piston 113a may be connected to a drive shaft 133 of the power conversion unit 130 which will be described below. As one example, the pressure chamber may include the first pressure chamber 112a located in front of the first hydraulic piston 113a (in a forward movement direction, that is, a leftward direction of the drawing), and the second pressure chamber 112b located in front of the second hydraulic piston 113b. Here, the first pressure chamber 112a may be a space comparted by means of a rear end of the first hydraulic piston 113a, a front end of the second hydraulic piston 113b, and an inner wall of the hydraulic pressure supply unit 110, and the second pressure chamber 112b may be a space comparted by means of a rear end of the second hydraulic piston 113b and the inner wall of the hydraulic pressure supply unit 110.

Also, a first hydraulic spring 114a may be provided between the first hydraulic piston 113a and the second hydraulic piston 113b, and a second hydraulic spring 114b may be provided between the second hydraulic piston 113b and an end of the cylinder block 111.

The first hydraulic spring 114a and the second hydraulic spring 114b are provided at the two pressure chambers 112a and 112b, respectively, and an elastic force is stored in the first hydraulic spring 114a and the second hydraulic spring 114b when the first hydraulic piston 113a and second hydraulic piston 113b are compressed. Further, when a force pushing the first hydraulic piston 113a is less than the elastic force, the first hydraulic spring 114a and the second hydraulic spring 114b may use the stored elastic force to push the first and second hydraulic pistons 113a and 113b and return the first and second hydraulic pistons 113a and 113b to their original positions, respectively.

The sealing member 115 may include a first sealing member 115a provided between the first hydraulic piston 113a and the cylinder block 111 to seal therebetween, and a second sealing member 115b provided between the second hydraulic piston 113b and the cylinder block 111 to seal therebetween.

The sealing member 115 seals the pressure chamber 112 to prevent hydraulic pressure or negative pressure from leaking therefrom. As one example, hydraulic pressure or negative pressure of the first pressure chamber 112a, which is generated while the first hydraulic piston 113a is moved forward or backward, may be blocked by the first and second sealing members 115a and 115b and may be delivered to a first hydraulic flow path 211 without leaking to the second pressure chamber 112b.

Referring back to FIG. 1, the first pressure chamber 112a is connected to the first hydraulic flow path 211 through a first communicating hole 111a formed at a rear side of the cylinder block 111 (in a backward movement direction, that is, a rightward direction of the drawing), and the second pressure chamber 112b is connected to a second hydraulic flow path 212 through a second communicating hole 111b formed at a front side of the cylinder block 111. The first hydraulic flow path 211 connects the hydraulic pressure supply unit 110 to the first hydraulic circuit 201, and the second hydraulic flow path 212 connects the hydraulic pressure supply unit 110 to the second hydraulic circuit 202.

The pressure chamber may be connected to the reservoir 30 through dump flow paths 116 and 117, and receive and store oil supplied from the reservoir 30 or deliver oil inside the pressure chamber to the reservoir 30. As one example, the dump flow paths may include a first dump flow path 116 branching from the first hydraulic flow path 211 and connected to the reservoir 30, and a second dump flow path 117 branching from the second hydraulic flow path 212 and connected to the reservoir 30.

Also, the electric brake system 1 according to the embodiment of the present disclosure may further include dump valves 231 and 232 which control opening and closing of the dump flow paths 116 and 117. The dump valves 231 and 232 may be configured with a check valve that is able to deliver hydraulic pressure in only one direction, and may allow hydraulic pressure to be delivered from the reservoir 30 to the first or second pressure chamber 112a or 112b and block hydraulic pressure from being delivered from the first or second pressure chamber 112a or 112b to the reservoir 30.

The dump valves include a first dump valve 231 installed at the first dump flow path 116 to control an oil flow, and a second dump valve 232 installed at the second dump flow path 117 to control an oil flow. The dump flow paths 116 and 117, at which the dump valves 231 and 232 are installed, may be connected to the hydraulic flow paths 211 and 212, and may be used when hydraulic pressure of the first or second pressure chamber 112a or 112b is supplemented.

Also, the hydraulic pressure supply unit 110 of the electric brake system 1 according to the embodiment of the present disclosure may be operated in a tandem manner. That is, hydraulic pressure, which is generated in the first pressure chamber 112a while the first hydraulic piston 113a is moved forward, may be delivered to the first hydraulic circuit 201 to activate the wheel cylinders 40 installed at the rear left wheel RL and the front right wheel FR, and hydraulic pressure, which is generated in the second pressure chamber 112b while the second hydraulic piston 113b is moved forward, may be delivered to the second hydraulic circuit 202 to activate the wheel cylinders 40 installed at the rear right wheel RR and the front left wheel FL.

The motor 120 is a device for generating a rotational force according to a signal output from the ECU (not shown) and may generate the rotational force in a forward or backward direction. An angular velocity and a rotational angle of the motor 120 may be precisely controlled. Because such a motor 120 is generally known in the art, a detailed description thereof will be omitted.

Meanwhile, the ECU controls not only the motor 120 but also the valves 54, 60, 221a, 221b, 221c, 221d, 222a, 222b, 222c, 222d, 241, 242, 250, 261, and 262 provided at the electric brake system 1 of the present disclosure, which will be described below. An operation of controlling a plurality of valves according to a displacement of the brake pedal 10 will be described below.

A driving force of the motor 120 generates a displacement of the first hydraulic piston 113a through the power conversion unit 130, and hydraulic pressure, which is generated while the first hydraulic piston 113a and the second hydraulic piston 113b slide inside the cylinder block 111, is delivered to the wheel cylinder 40 installed at each of the wheels RR, RL, FR, and FL through the first and second hydraulic flow paths 211 and 212.

The power conversion unit 130 is a device for converting a rotational force into a rectilinear movement, and, as one example, may be configured with a worm shaft 131, a worm wheel 132, and the drive shaft 133.

The worm shaft 131 may be integrally formed with a rotational shaft of the motor 120, and rotates the worm wheel 132 engaged therewith and coupled thereto through a worm that is formed on an outer circumferential surface of the worm shaft 131. The worm wheel 132 linearly moves the drive shaft 133 engaged therewith and coupled thereto, and the drive shaft 133 is connected to the first hydraulic piston 113a to slide the first hydraulic piston 113a inside the cylinder block 111.

To describe such operations again, a signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the first hydraulic piston 113a connected to the drive shaft 133 is moved forward to generate hydraulic pressure in the pressure chamber.

On the other hand, when the pedal effort is released from the brake pedal 10, the ECU activates the motor 120 in a reverse direction to reversely rotate the worm shaft 131. Consequently, the worm wheel 132 is also reversely rotated, and then the first hydraulic piston 113a connected to the drive shaft 133 is returned to its original position.

A signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the first hydraulic piston 113a connected to the drive shaft 133 is moved forward to generate hydraulic pressure in the first pressure chamber 112a. Further, the hydraulic pressure of the first pressure chamber 112a may move the second hydraulic piston 113b forward to generate hydraulic pressure in the second pressure chamber 112b.

On the other hand, when the pedal effort is released from the brake pedal 10, the ECU activates the motor 120 in a reverse direction, and thus the worm shaft 131 is reversely rotated. Consequently, the worm wheel 132 is also reversely rotated, and thus negative pressure is generated in the first pressure chamber 112a while the first hydraulic piston 113a connected to the drive shaft 133 is returned to its original position, that is, is moved backward. Further, the negative pressure in the first pressure chamber 112a and the elastic force of the first and second hydraulic springs 114a and 114b may move the second hydraulic piston 113b backward to generate negative pressure in the second pressure chamber 112b.

As described above, the hydraulic pressure supply device 100 serves to deliver the hydraulic pressure to the wheel cylinders 40 or to discharge and deliver the hydraulic pressure to the reservoir 30 according to a rotational direction of the rotational force generated from the motor 120.

Although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft thereof, and a ball nut which is screw-coupled to the screw in a state in which a rotation of the ball nut is restricted to perform a rectilinear movement according to a rotation of the screw. The first hydraulic piston 113a is connected to the ball nut of the power conversion unit 130 to pressurize the pressure chamber by means of the rectilinear movement of the ball nut. Such a ball screw nut assembly is a device for converting a rotational movement into a rectilinear movement, and a structure thereof is generally known in the art so that a detailed description thereof will be omitted.

Also, it should be understood that the power conversion unit 130 according to the embodiment of the present disclosure may employ any structure capable of converting a rotational movement into a rectilinear movement in addition to the structure of the ball screw nut assembly.

Further, the electric brake system 1 according to the embodiment of the present disclosure may further include the first and second backup flow paths 251 and 252 capable of directly supplying oil discharged from the master cylinder 20 to the wheel cylinders 40 when the hydraulic pressure supply device 100 operates abnormally.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24a to the first hydraulic circuit 201, and the second backup flow path 252 may connect the second hydraulic port 24b to the second hydraulic circuit 202.

Further, the first and second cut valves 261 and 262 may be configured with a normally opened type solenoid valve that is usually opened and is closed when a closing signal is received from the ECU.

Next, the hydraulic control unit 200 according to the embodiment of the present disclosure will be described with reference to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the rear left wheel RL, and the second hydraulic circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic circuit 201 is connected to the first hydraulic flow path 211 to receive the hydraulic pressure provided from the hydraulic pressure supply device 100, and the first hydraulic flow path 211 branches into two flow paths that are connected to the front right wheel FR and the rear left wheel RL, respectively. Similarly, the second hydraulic circuit 202 is connected to the second hydraulic flow path 212 to receive the hydraulic pressure provided from the hydraulic pressure supply device 100, and the second hydraulic flow path 212 branches into two flow paths that are connected to the front left wheel FL and the rear right wheel RR, respectively.

The hydraulic circuits 201 and 202 may be provided with a plurality of inlet valves 221 (that is, 221a, 221b, 221c, and 221d) to control a hydraulic pressure flow. As one example, two inlet valves 221a and 221b may be provided at the first hydraulic circuit 201 and connected to the first hydraulic flow path 211 to independently control the hydraulic pressure delivered to two of the wheel cylinders 40. Also, two inlet valves 221c and 221d may be provided at the second hydraulic circuit 202 and connected to the second hydraulic flow path 212 to independently control the hydraulic pressure delivered to two of the wheel cylinders 40.

Further, the plurality of inlet valves 221 may be disposed at an upstream side of each of the wheel cylinders 40 and may be configured with a normally closed type solenoid valve that is usually closed and is opened when an opening signal is received from the ECU.

Also, the hydraulic control unit 200 may be further provided with a plurality of outlet valves 222 (that is, 222a, 222b, 222c, and 222d) connected to the reservoir 30 to improve brake release performance when the brake is released. Each of the outlet valves 222 is connected to the wheel cylinder 40 to control discharging of the hydraulic pressure from each of the wheels RR, RL, FR, and FL. That is, when brake pressure of each of the wheels RR, RL, FR, and FL is measured and a decompression of the brake is determined to be required, the outlet valves 222 may be selectively opened to control the brake pressure.

Further, the outlet valves 222 may be configured with a normally closed type solenoid valve that is usually closed and is opened when an opening signal is received from the ECU.

In addition, the hydraulic control unit 200 may be connected to the backup flow paths 251 and 252. As one example, the first hydraulic circuit 201 may be connected to the first backup flow path 251 to receive the hydraulic pressure provided from the master cylinder 20, and the second hydraulic circuit 202 may be connected to the second backup flow path 252 to receive the hydraulic pressure provided from the master cylinder 20.

At this point, the first backup flow path 251 may be connected to the first hydraulic circuit 201 at a downstream side of the first inlet valve 221a. Similarly, the second backup flow path 252 may be connected to the second hydraulic circuit 202 at a downstream side of the fourth inlet valve 221d. Consequently, when the first and second cut vales 261 and 262 are closed and the plurality of inlet valves 221a, 221b, 221c, and 221d are opened, the hydraulic pressure provided from the hydraulic pressure supply device 100 may be supplied to the wheel cylinders 40 through the first and second hydraulic flow paths 211 and 212. Also, when the first and second cut vales 261 and 262 are opened and the plurality of inlet valves 221a, 221b, 221c, and 221d are closed, the hydraulic pressure provided from the master cylinder 20 may be supplied to the wheel cylinders 40 through the first and second backup flow paths 251 and 252.

Moreover, the first hydraulic circuit 201 includes a first balance valve 241 connecting a branching flow path, which connects the first inlet valve 221a to the wheel cylinder 40 installed at the front right wheel FR, to a branching flow path, which connects the second inlet valve 221b to the wheel cylinder 40 installed at the rear left wheel RL. Additionally, the second hydraulic circuit 202 includes a second balance valve 242 connecting a branching flow path, which connects the third inlet valve 221c to the wheel cylinder 40 installed at the front left wheel FL, to a branching flow path, which connects the fourth inlet valve 221d to the wheel cylinder 40 installed at the rear right wheel RR.

The first balance valve 241 is provided at a flow path connecting the two branching flow paths of the first hydraulic circuit 201 and serves to connect or block the two branching flow paths according to opening and closing operations, and the second balance valve 242 is provided at a flow path connecting the two branching flow paths of the second hydraulic circuit 202 and serves to connect or block the two branching flow paths according to the opening and closing operations.

Also, the first and second balance valves 241 and 242 may be configured with a normally opened type solenoid valve that is usually opened and is closed when a closing signal is received from the ECU.

The first balance valve 241 is operated to be opened when one of the first inlet valve 221a and the second inlet valve 221b is incorrectly operated so that the hydraulic pressure may be delivered to the front right wheel FR and the rear left wheel RL. Similarly, the second balance valve 242 is operated to be opened when one of the third inlet valve 221c and the fourth inlet valve 221d is incorrectly operated so that the hydraulic pressure may be delivered to the front left wheel FL and the rear right wheel RR.

As one example, because an initial position of the first balance valve 241 is in an open state in a braking mode even when the first inlet valve 221a is not in an open state, oil passing the second inlet valve 221b may be delivered to the wheel cylinder 40 of the front right wheel FR through the first balance valve 241. That is, even when the inlet valves 221 are incorrectly operated, the balance valves 241 and 242 may supply the hydraulic pressure to the four wheel cylinders 40 to assure stable braking.

Also, the hydraulic control unit 200 of the electric brake system 1 according to the embodiment of the present disclosure may include a circuit balance valve 250 that is installed to control opening and closing of a flow path for communicating the first pressure chamber 112a with the second pressure chamber 112b.

As one example, the circuit balance valve 250 may be installed at a flow path for communicating the first hydraulic flow path 211 and the second hydraulic flow path 212. At this point, the flow path at which the circuit balance valve 250 is installed may branch at an upstream of each of the inlet valves 221.

Referring to FIG. 1, the flow path at which the circuit balance valve 250 is installed may connect points, at which the first hydraulic flow path 211 and the second hydraulic flow path 212 branch into the two inlet valves 221a and 221b, and the two inlet valves 221c and 221d, respectively, to each other.

Further, the circuit balance valve 250 may be configured with a normally closed type solenoid valve that is usually closed and is opened when an opening signal is received from the ECU.

The circuit balance valve 250 may perform a balancing process to equilibrate the pressure chambers 112a and 112b in pressure inside the hydraulic pressure supply unit 110.

Generally, pressure of the first pressure chamber 112a and the second pressure chamber 112b balances. As one example, when an ABS in which a braking force is provided to only the front right wheel FR operates, only the hydraulic pressure of the first pressure chamber 112a of the two pressure chambers is delivered to the wheel cylinder 40. Even in such a case, a balance in pressure between the two pressure chambers may be maintained because the oil of the reservoir 30 is delivered to the second pressure chamber 112b through the dump valves 231.

However, when a leak occurs due to a repetitive operation of the hydraulic pressure supply device 100 or an ABS operation is abruptly performed, an imbalance in pressure between the first pressure chamber 112a and the second pressure chamber 112b may be caused. That is, the second hydraulic piston 113b may not be located at a calculated position to cause an incorrect operation.

The circuit balance valve 250 is switched to an open state in such a situation to connect the first hydraulic flow path 211 to the second hydraulic flow path 212, thereby communicating the first pressure chamber 112a and the second pressure chamber 112b with each other. Therefore, a balance in pressure between the first pressure chamber 112a and the second pressure chamber 112b is established. At this point, to promote the balancing process, the motor 120 may be operated to push the first hydraulic piston 113a.

Also, even when one of the first hydraulic circuit 201 and the second hydraulic circuit 202 is incorrectly operated, the circuit balance valve 250 may deliver the hydraulic pressure to the four wheel cylinders 40 to assure stable braking.

When hydraulic pressure is not properly formed in the first pressure chamber 112a, or the first inlet valve 221a or the second inlet valve 221b is incorrectly operated, the hydraulic pressure provided from the first pressure chamber 112a may not be delivered to the wheel cylinder 40 provided at the front right wheel FR or the rear left wheel RL to cause an unstable braking situation.

At this point, the circuit balance valve 250 is switched to an open state to connect the first hydraulic circuit 201 to the second hydraulic circuit 202 so that the hydraulic pressure may be delivered to the four wheel cylinders 40 under the incorrect operation situation to assure stable braking.

Meanwhile, an undescribed reference number "PS11" is a first hydraulic flow path pressure sensor which senses hydraulic pressure of the first hydraulic circuit 201, an undescribed reference number "PS12" is a second hydraulic flow path pressure sensor which senses hydraulic pressure of the second hydraulic circuit 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

Also, the electric brake system 1 according to the embodiment of the present disclosure may further include an inspection valve 60 that is installed at a flow path 31 connecting the master cylinder 20 to the reservoir 30. As described above, the flow path 31 connecting the master cylinder 20 to the reservoir 30 may be provided to correspond to the number of chambers inside the master cylinder 20.

Hereinafter, one example in which a plurality of flow paths 31, each of which connects the master cylinder 20 to the reservoir 30, are provided and the inspection valve 60 is installed at one of the plurality of flow paths 31 will be described. At this point, the remaining flow paths at which the inspection valve 60 is not installed may be blocked by controlling the valves including the second cut valve 262 and the like.

The flow path 31, which connects the reservoir 30 to a chamber provided between the first piston 21a and the second piston 22a of the master cylinder 20, may be configured with two flow paths connected in parallel with each other. A check valve 32 may be installed at one of the two flow paths connected in parallel with each other, and the inspection valve 60 may be installed at the other thereof.

The check valve 32 is provided to allow hydraulic pressure to be delivered from the reservoir 30 to the master cylinder 20, and to block the hydraulic pressure to be delivered from the master cylinder 20 to the reservoir 30. Further, the inspection valve 60 may be controlled to allow and block the hydraulic pressure that is delivered between the reservoir 30 and the master cylinder 20.

Consequently, when the inspection valve 60 is opened, the hydraulic pressure in the reservoir 30 may be delivered to the master cylinder 20 through the flow path at which the check valve 32 is installed and a flow path 61 at which the inspection valve 60 is installed, and the hydraulic pressure in the master cylinder 20 may be delivered to the reservoir 30 therethrough. Further, when the inspection valve 60 is closed, the hydraulic pressure in the reservoir 30 may be delivered to the master cylinder 20 through the flow path at which the check valve 32 is installed, but the hydraulic pressure in the master cylinder 20 is not delivered to the reservoir 30 through any flow path.

Meanwhile, the electric brake system 1 according to the embodiment of the present disclosure may be provided to usually allow the hydraulic pressure to be bidirectionally delivered between the reservoir 30 and the master cylinder 20, whereas, in an inspection mode, it may be provided to allow the hydraulic pressure to be delivered from the reservoir 30 to the master cylinder 20 but block the hydraulic pressure from being delivered from the master cylinder 20 to the reservoir 30.

Therefore, the inspection valve 60 may be configured with a normally opened type solenoid valve that is usually open and is closed when a closing signal is received.

As one example, the inspection valve 60 is maintained in an open state in a braking mode to allow the hydraulic pressure to be bidirectionally delivered between the reservoir 30 to the master cylinder 20. In addition, the inspection valve 60 may be maintained in a closed state in an inspection mode to prevent the hydraulic pressure in the master cylinder 20 from being delivered to the reservoir 30.

The inspection mode is a mode that inspects whether a loss of pressure exists by generating hydraulic pressure at the hydraulic pressure supply device 100 to inspect whether a leak occurs in the simulator valve 54. When the hydraulic pressure discharged from the hydraulic pressure supply device 100 is delivered to the reservoir 30 to cause the loss of pressure, it is difficult to identify whether a leak occurs in the simulator valve 54.

Therefore, in the inspection mode, the inspection valve 60 may be closed and thus a hydraulic circuit connected to the hydraulic pressure supply device 100 may be configured as a closed circuit. That is, the inspection valve 60, the simulator valve 54, the outlet valves 222, and the circuit balance valve 250 are closed and thus the flow paths connecting the hydraulic pressure supply device 100 to the reservoirs 30 are blocked so that the closed circuit may be configured.

In the inspection mode, the electric brake system 1 according to the embodiment of the present disclosure may provide the hydraulic pressure to only the first backup flow path 251, which is connected to the simulation device 50, of the first and second backup flow paths 251 and 252. Therefore, to prevent the hydraulic pressure discharged from the hydraulic pressure supply device 100 from being delivered to the master cylinder 20 through the second backup flow path 252, the third and fourth inlet valves 221c and 221d connected to the second hydraulic flow path 212 may be maintained in the closed state and the second cut valve 262 may be switched to a closed state.

In the inspection mode, whether a loss of the hydraulic pressure occurs may be determined through a measurement by means of the backup flow path pressure sensor PS2 after the hydraulic pressure is generated in the hydraulic pressure supply device 100. When the measurement result of the backup flow path pressure sensor PS2 indicates no occurrence of loss, a leak of the simulator valve 54 may be determined as not existing, and otherwise, when the measurement result thereof indicates the occurrence of loss, a leak may be determined as existing in the simulator valve 54.

Meanwhile, the inspection mode may be controlled to be executed when a vehicle is stopped or when it is determined that the driver has no intent to accelerate the vehicle.

At this point, when the hydraulic pressure discharged from the hydraulic pressure supply device 100 is provided to the wheel cylinders 40 in the inspection mode, a braking force not intended by the driver is generated. In this case, there is a problem in that acceleration intended by the driver is not realized due to the braking force which has been already provided even when the driver steps on an accelerator pedal (not shown). To prevent such a problem, the inspection mode may be controlled to be executed when a predetermined time passes after the vehicle has been stopped, in a state in which a hand brake is currently operated, or when the driver applies a predetermined braking force to the vehicle.

Also, when it is determined that the drive has an intent to accelerate the vehicle in a state of the inspection mode, the hydraulic pressure of the wheel cylinders 40 may be rapidly eliminated. That is, when the driver operates the accelerator pedal in the state of the inspection mode, the hydraulic pressure supply device 100 may be operated in reverse to an operation performed in the state of the inspection mode so that the hydraulic pressure of the wheel cylinders 40 may be rapidly eliminated. At this point, the outlet valves 222 may also be opened to assist in releasing the hydraulic pressure of the wheel cylinders 40 to the reservoirs 30.

Hereinafter, an operation of the electric brake system 1 according to the embodiment of the present disclosure will be described in detail.

FIG. 3 is a hydraulic circuit diagram illustrating a state in which the electric brake system 1 according to the embodiment of the present disclosure normally performs a braking operation.

When a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 to activate the motor 120.

Also, the ECU may receive an amount of regenerative braking through the backup flow path pressure sensor PS2 provided at the outlet side of the master cylinder 20 and the first and second hydraulic flow path pressure sensors PS11 and PS12 respectively provided at the first and second hydraulic circuits 201 and 202, and may calculate an amount of braking friction based on a difference between the amount of braking requested by the driver and the amount of regenerative braking, thereby determining the magnitude of an increase or reduction of pressure at the wheel cylinder 40.

Referring to FIG. 3, when the driver steps on the brake pedal 10 at an initial stage of braking, the motor 120 is operated to rotate in one direction, a rotational force of the motor 120 is delivered to the hydraulic pressure supply unit 110 by means of the power conversion unit 130, and thus hydraulic pressure is generated in the first pressure chamber 112a and the second pressure chamber 112b while the first hydraulic piston 113a and the second hydraulic piston 113b of the hydraulic pressure supply unit 110 move forward. The hydraulic pressure discharged from the hydraulic pressure supply unit 110 is delivered to the wheel cylinder 40 installed at each of the four wheels through the first hydraulic circuit 201 and the second hydraulic circuit 202 to generate a braking force.

In particular, the hydraulic pressure provided from the first pressure chamber 112a is directly delivered to the wheel cylinder 40 provided at the front right wheel FR through the first hydraulic flow path 211 connected to the first communicating hole 111a. At this point, the first inlet valve 221a is switched to an open state. The first and second outlet valves 222a and 222b installed at flow paths respectively branching from two flow paths, which branch from the first hydraulic flow path 211, are maintained in the closed state to prevent the hydraulic pressure from leaking to the reservoirs 30.

Meanwhile, the second inlet valve 221b may be maintained in the closed state, and the first balance valve 241 may be maintained in the open state. Therefore, the hydraulic pressure passing the first inlet valve 221a may be delivered to the wheel cylinder 40 provided at the rear left wheel RL through the first balance valve 241 to generate a braking force.

Also, the hydraulic pressure provided from the second pressure chamber 112b is directly delivered to the wheel cylinder 40 provided at the rear right wheel RR through the second hydraulic flow path 212 connected to the second communicating hole 111b. At this point, the fourth inlet valve 221d is switched to an open state. The third and fourth outlet valves 222c and 222d installed at flow paths respectively branching from two flow paths, which branch from the second hydraulic flow path 212, are maintained in the closed state to prevent the hydraulic pressure from leaking to the reservoirs 30.

Meanwhile, the third inlet valve 221c may be maintained in the closed state, and the second balance valve 242 may be maintained in the open state. Therefore, the hydraulic pressure passing the fourth inlet valve 221d may also be delivered to the wheel cylinder 40 provided at the front left wheel FL through the second balance valve 242 to generate a braking force.

Also, when the hydraulic pressure is generated at the hydraulic pressure supply device 100, the first and second cut valves 261 and 262, which are installed at the first and second backup flow paths 251 and 252 connected to the first and second hydraulic ports 24a and 24b of the master cylinder 20, are closed so that the hydraulic pressure discharged from the master cylinder 20 is not delivered to the wheel cylinder 40.

In addition, the pressure generated by means of a pressurization of the master cylinder 20 according to the pedal effort of the brake pedal 10 is delivered to the simulation device 50 connected to the master cylinder 20. At this point, the normally closed type simulator valve 54 arranged at the rear end of the simulation chamber 51 is opened so that the oil filled in the simulation chamber 51 is delivered to the reservoir 30 through the simulator valve 54. Also, the reaction force piston 52 is moved, and pressure corresponding to a reaction force of the reaction force spring 53 supporting the reaction force piston 52 is generated inside the simulation chamber 51 to provide an appropriate pedal feeling to the driver.

Next, a case of releasing the braking force in a braking state established when the electric brake system 1 according to the embodiment of the present disclosure operates normally will be described.

FIG. 4 is a hydraulic circuit diagram illustrating a state in which the electric brake system 1 according to the embodiment of the present disclosure releases braking normally.

Referring to FIG. 4, when a pedal effort applied to the brake pedal 10 is released, the motor 120 generates a rotational force in a reverse direction compared to that of when the braking operation is performed to deliver the generated rotational force to the power conversion unit 130, and the worm shaft 131, the worm wheel 132, and the drive shaft 133 of the power conversion unit 130 are rotated in a reverse direction compared to that of when the braking operation is performed to move the first hydraulic piston 113a and the second hydraulic piston 113b backward and return the first hydraulic piston 113a and the second hydraulic piston 113b to their original positions, thereby releasing the pressure of the first pressure chamber 112a and the second pressure chamber 112b, or forming negative pressure therein. Further, the hydraulic pressure supply unit 110 receives the hydraulic pressure discharged from the wheel cylinder 40 through the first and second hydraulic circuits 201 and 202 to deliver the received hydraulic pressure to the first pressure chamber 112a and the second pressure chamber 112b.

In particular, the negative pressure formed in the first pressure chamber 112a is directly delivered to the wheel cylinder 40 provided at the front right wheel FR through the first hydraulic flow path 211 connected to the first communicating hole 111a to release the braking force. At this point, the first inlet valve 221a is switched to an open state. Also, the first and second outlet valves 222a and 222b installed at flow paths respectively branching from two flow paths, which branch from the first hydraulic flow path 211, are maintained in the closed state.

Meanwhile, the second inlet valve 221b may be maintained in the closed state, and the first balance valve 241 may be maintained in the open state. Therefore, the negative pressure delivered through the first inlet valve 221a may also be delivered to the wheel cylinder 40 provided at the rear left wheel RL through the first balance valve 241 to release the braking force.

Also, the negative pressure provided from the second pressure chamber 112b is directly delivered to the wheel cylinder 40 provided at the rear right wheel RR through the second hydraulic flow path 212 connected to the second communicating hole 111b to release the braking force. At this point, the fourth inlet valve 221d is switched to an open state. In addition, the third and fourth outlet valves 222c and 222d installed at flow paths respectively branching from two flow paths, which branch from the second hydraulic flow path 212, are maintained in the closed state.

Meanwhile, the third inlet valve 221c may be maintained in the closed state, and the second balance valve 242 may be maintained in the opened state. Therefore, the negative pressure delivered through the fourth inlet valve 221d may also be delivered to the wheel cylinder 40 provided at the front left wheel FL through the second balance valve 242 to release the braking force.

Also, when the negative pressure is generated at the hydraulic pressure supply device 100, the first and second cut valves 261 and 262, which are installed at the first and second backup flow paths 251 and 252 connected to the first and second hydraulic ports 24a and 24b of the master cylinder 20, are closed so that the negative pressure generated in the master cylinder 20 is not delivered to the wheel cylinder 40.

Meanwhile, in the simulation device 50, the oil in the simulation chamber 51 is delivered to the master cylinder 20 according to the return of the reaction force piston 52 to its original position by means of the elastic force of the reaction force spring 53, and the oil is refilled in the simulation chamber 51 through the simulator valve 54 and the simulator check valve 55 which are connected to the reservoir 30 to assure a rapid return of pressure of the pedal simulator.

Further, the electric brake system 1 according to the embodiment of the present disclosure may control the valves 221a, 221b, 221c, 221d, 222a, 222b, 222c, 222d, 241, 242, and 250 provided at the hydraulic control unit 200 according to pressure required for the wheel cylinder 40 provided at each of the wheels RR, RL, FR, and FL of the two hydraulic circuits 201 and 202, thereby specifying and controlling a control range.

FIG. 5 is a hydraulic circuit diagram illustrating a state in which an ABS is operated through the electric brake system according to the embodiment of the present disclosure. FIG. 5 shows a case of braking only a corresponding wheel cylinder 40 while the ABS is operated.

When the motor 120 is operated according to a pedal effort of the brake pedal 10, a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure discharged from the master cylinder 20 is not delivered to the wheel cylinders 40.

Referring FIG. 5, hydraulic pressure is generated in the first pressure chamber 112a and the second pressure chamber 112b while the first hydraulic piston 113a and the second hydraulic piston 113b are moved forward, the fourth inlet valve 221d is switched to an open state, and thus the hydraulic pressure delivered through the second hydraulic flow path 212 activates the wheel cylinder 40 located at the rear right wheel RR to generate a braking force.

At this point, the first to third inlet valves 221a, 221b, and 221c and the first to fourth outlet valves 222a, 222b, 222c, and 222d are maintained in the closed state. Further, the circuit balance valve 250 is maintained in the closed state to prevent the hydraulic pressure of the second hydraulic flow path 212 from being delivered to the first hydraulic flow path 211, and the second balance valve 242 is switched to a closed state so that the hydraulic pressure passing the fourth inlet valve 221d is not delivered to the front left wheel FL.

FIG. 6 is a hydraulic circuit diagram illustrating a case in which the electric brake system 1 according to the embodiment of the present disclosure supplements hydraulic pressure.

While the hydraulic pressure of the pressure chamber 112 is delivered to the wheel cylinders 40, the hydraulic pressure inevitably decreases. In such a circumstance, this may be dangerous in that a strong braking force as intended by a driver may not be delivered to the wheel cylinders 40 when a situation requiring the strong braking force occurs. Therefore, a supplement mode which maintains hydraulic pressure in the pressure chamber 112 at a predetermined level is needed.

Referring to FIG. 6, a supplement mode is executed in a state in which a braking operation is not performed. As one example, when a braking operation is not performed for a predetermined time, the supplement mode may be executed.

In the supplement mode, the first to fourth inlet valves 221a, 221b, 221c, and 221d, the first to fourth outlet valves 222a, 222b, 222c, and 222d, and the first and second cut valves 261 and 262 are maintained in the closed state. In such a state, the motor 120 is reversely operated to return the first hydraulic piston 113a and the second hydraulic piston 113b to their original positions. As a result, negative pressure is formed in the first pressure chamber 112a and the second pressure chamber 112b and oil flows into the first pressure chamber 112a and the second pressure chamber 112b through the dump flow paths 116 and 117 such that hydraulic pressure is supplemented.

Next, a case in which such an electric brake system 1 operates abnormally will be described. FIG. 7 is a hydraulic circuit diagram illustrating a case in which the electric brake system 1 according to the embodiment of the present disclosure operates abnormally.

Referring to FIG. 7, when the electric brake system 1 operates abnormally, each of the valves 54, 60, 221a, 221b, 221c, 221d, 222a, 222b, 222c, 222d, 241, 242, 250, 261, and 262 is provided in an initial state of braking, that is, a non-operating state. When a driver pressurizes the brake pedal 10, the input rod 12 connected to the brake pedal 10 is moved forward, and at the same time, the first piston 21a, which is in contact with the input rod 12, is moved forward and the second piston 22a is also moved forward by means of the pressurization or movement of the first piston 21a. At this point, because there is no gap between the input rod 12 and the first piston 21a, the braking may be rapidly performed.

Further, the hydraulic pressure discharged from the master cylinder 20 is delivered to the wheel cylinders 40 through the first and second backup flow paths 251 and 252 that are connected for the purpose of backup braking to realize a braking force.

At this point, the first and second cut valves 261 and 262 respectively installed at the first and second backup flow paths 251 and 252, and the first and second balance valves 241 and 242 provided at the downstream side of each of the inlet valves 221 and connecting the first hydraulic circuit 201 to the second hydraulic circuit 202 are configured with a normally opened type solenoid valve, and the simulator valve 54, the inlet valves 221, and the outlet valves 222 are configured with a normally closed type solenoid valve so that the hydraulic pressure is directly delivered to the four wheel cylinders 40. Therefore, braking is stably realized to improve braking safety.

FIG. 8 is a hydraulic circuit diagram illustrating a state in which the electric brake system 1 according to the embodiment of the present disclosure operates in a dump mode.

The electric brake system 1 according to the embodiment of the present disclosure may deliver braking pressure provided only to corresponding wheel cylinders 40 through the first to fourth outlet valves 222a, 222b, 222c, and 222d.

Referring to FIG. 8, when the first to fourth inlet valves 221a, 221b, 221c, and 221d and the first to third outlet valves 222a, 222b, and 222c are maintained in the closed state, the second balance valve 242 is switched to the closed state, and the fourth outlet valve 222d is switched to the opened state, the hydraulic pressure discharged from the wheel cylinder 40 installed at the rear right wheel RR is discharged to the reservoir 30 through the fourth outlet valve 222d.

Meanwhile, although not shown in the drawing, the fourth outlet valve 222d may be opened to discharge the hydraulic pressure of the relevant wheel cylinder 40, at the same time, the first to third inlet valves 221a, 221b, and 221c may be opened, and the first balance valve 241 may be opened to supply the hydraulic pressure to the three remaining wheels FR, RL, and FL.

As described above, each of the valves 221a, 221b, 221c, 221d, 222a, 222b, 222c, 222d, 241, 242, and 250 of the hydraulic control unit 200 may be independently controlled to selectively deliver or discharge the hydraulic pressure to the wheel cylinder 40 of each of the wheels RL, RR, FL, and FR such that a precise control of the hydraulic pressure may be possible.

FIG. 9 is a hydraulic circuit diagram illustrating a state in which the electric brake system 1 according to the embodiment of the present disclosure operates in a balance mode.

The balance mode is performed when an imbalance in pressure between the first pressure chamber 112a and the second pressure chamber 112b occurs. As one example, the ECU may sense an imbalance state in pressure by analyzing signals transmitted from the first hydraulic flow path pressure sensor PS11 sensing the hydraulic pressure of the first hydraulic circuit 201 and the second hydraulic flow path pressure sensor PS12 sensing the hydraulic pressure of the second hydraulic circuit 202.

In the balance mode, the circuit balance valve 250 is switched to an open state. When the circuit balance valve 250 is opened so that the first hydraulic flow path 211 and the second hydraulic flow path 212 communicate with each other, a balance in pressure between the first pressure chamber 112a and the second pressure chamber 112b may occur. However, to rapidly proceed the balancing process, the hydraulic pressure supply device 100 may be operated.

Hereinafter, an example when pressure in the second pressure chamber 112b is greater than that in the first pressure chamber 112a will be described. When the motor 120 is activated, the first hydraulic piston 113a and the second hydraulic piston 113b are moved forward, the hydraulic pressure of the second pressure chamber 112b is delivered from the second hydraulic flow path 212 to the first hydraulic flow path 211 through the circuit balance valve 250 that is in the open state, and, during such a process, a balance in pressure between the second pressure chamber 112b and the first pressure chamber 112a is accomplished.

When the pressure in the first pressure chamber 112a is greater than that in the second pressure chamber 112b, the hydraulic pressure of the first pressure chamber 112a is delivered to the second pressure chamber 112b to balance pressure.

As shown in FIG. 7, when the electric brake system 1 operates abnormally, each of the valves 54, 60, 221a, 221b, 221c, 221d, 222a, 222b, 222c, 222d, 241, 242, 250, 261, and 262 is provided in an initial state of braking, that is, a non-braking state, and the first and second cut valves 261 and 262 installed at the first and second backup flow paths 251 and 252 and the inlet valves 221 provided at the upstream of each of the wheels RR, RL, FR, and FL are opened so that the hydraulic pressure is directly provided to the wheel cylinders 40.

Also, the simulator valve 54 is provided in the closed state so that the hydraulic pressure delivered to the wheel cylinder 40 through the first backup flow path 251 is prevented from leaking to the reservoir 30 through the simulation device 50.

Therefore, the driver steps on the brake pedal 10 so that the hydraulic pressure discharged from the master cylinder 20 is delivered to the wheel cylinders 40 without a loss to assure stable braking.

However, when a leak occurs at the simulator valve 54, a portion of the hydraulic pressure discharged from the master cylinder 20 may be lost to the reservoir 30 through the simulator valve 54. The simulator valve 54 is provided to be closed in an abnormal mode, and the hydraulic pressure discharged from the master cylinder 20 pushes the reaction force piston 52 of the simulation device 50 so that a leak may occur at the simulator valve 54 by means of pressure formed at the rear end of the simulation chamber 51.

As such, when the leak occurs at the simulator valve 54, a braking force may not be obtained as intended by the driver. Consequently, there is a problem in safety of braking.

FIG. 10 is a hydraulic circuit diagram illustrating a state in which the electric brake system 1 according to the embodiment of the present disclosure operates in an inspection mode.

The inspection mode is a mode that inspects whether a loss of pressure exists by generating hydraulic pressure at the hydraulic pressure supply device 100 to inspect whether a leak occurs in the simulator valve 54. When the hydraulic pressure discharged from the hydraulic pressure supply device 100 is delivered to the reservoir 30 to cause a loss of pressure, it is difficult to identify whether a leak occurs in the simulator valve 54.

Therefore, in the inspection mode, the inspection valve 60 may be closed and thus a hydraulic circuit connected to the hydraulic pressure supply device 100 may be configured as a closed circuit. That is, the inspection valve 60, the simulator valve 54, and the outlet valves 222 are closed and thus the flow paths connecting the hydraulic pressure supply device 100 to the reservoirs 30 are closed so that the closed circuit may be configured.

In the inspection mode, the electric brake system 1 according to one embodiment of the present disclosure may provide the hydraulic pressure to only the first backup flow path 251, which is connected to the simulation device 50, of the first and second backup flow paths 251 and 252. Therefore, to prevent the hydraulic pressure discharged from the hydraulic pressure supply device 100 from being delivered to the master cylinder 20 through the second backup flow path 252, the second cut valve 262 and the circuit balance valve 250 may be maintained in the closed state in the inspection mode.

Referring to FIG. 10, in the inspection mode, at the initial state of the valves 54, 60, 221a, 221b, 221c, 221d, 222a, 222b, 222c, 222d, 241, 242, 250, 261, and 262 provided at the electric brake system 1 of the present disclosure, the first inlet valve 221a or the second inlet valve 221b and the first cut valve 261 may be switched to an open state so that the hydraulic pressure generated at the hydraulic pressure supply device 100 may be transmitted to the master cylinder 20. At this point, when the first inlet valve 221a is opened, the second inlet valve 221b and the first balance valve 241 are closed, and, when the second inlet valve 221b is opened, the first balance valve 241 is closed.

In the inspection mode, after generating the hydraulic pressure at the hydraulic pressure supply device 100, the ECU may analyze a signal transmitted from the backup flow path pressure sensor PS2 measuring oil pressure of the master cylinder 20 to sense whether a leak occurs at the simulator valve 54.

When there is no loss on the basis of the measurement result of the backup flow path pressure sensor PS2, the simulator valve 54 may be determined to have no leak, and when the loss occurs, the simulator valve 54 may be determined to have a leak.

As is apparent from the above description, the electric brake system according to the embodiments of the present disclosure is capable of more rapidly provide hydraulic pressure and more precisely controlling an increase of pressure by providing a plurality of pistons of a hydraulic pressure supply device to configure a tandem structure.

Also, a balance valve, which communicates with a plurality of hydraulic flow paths respectively communicating with a plurality of chambers, may be included to balance in pressure between the plurality of chambers.

In addition, an inspection valve, which is capable of opening and blocking a hydraulic pressure supply between reservoirs and a master cylinder, may be included to inspect whether a leak of a valve in a circuit occurs or not.

| [Description of Reference Numerals] | |
|---|---|
| 10: Brake Pedal | 11: Pedal Displacement Sensor |
| 20: Master Cylinder | 30: Reservoir |
| 40: Wheel Cylinder | 50: Simulation Device |
| 54: Simulator Valve | 60: Inspection Valve |
| 100: Hydraulic Pressure Supply Device | 110: Hydraulic Pressure Supply Unit |
| 120: Motor | 130: Power Conversion Unit |
| 200: Hydraulic Control Unit | 201: First Hydraulic Circuit |
| 202: Second Hydraulic Circuit | 211: First Hydraulic Flow Path |
| 212: Second Hydraulic Flow Path | 221: Inlet Valve |
| 222: Outlet Valve | 231: First Dump Valve |
| 232: Second Dump Valve | 241: First Balance Valve |
| 242: Second Balance Valve | 250: Circuit Balance Valve |
| 251: First Backup Flow Path | 252: Second Backup Flow Path |
| 261: First Cut Valve | 262: Second Cut Valve |

What is claimed is:

1. An electric brake system comprising:
    a hydraulic pressure supply device configured to generate hydraulic pressure using a hydraulic piston which is activated by means of an electrical signal that is output corresponding to a displacement of a brake pedal, and including a cylinder block, first and second hydraulic pistons movably accommodated inside the cylinder block, and first and second pressure chambers comparted by the first and second hydraulic pistons;
    a first hydraulic circuit configured to connect a first hydraulic flow path communicating with the first pressure chamber to one or more wheel cylinders and comprising first and second inlet valves;
    a second hydraulic circuit configured to connect a second hydraulic flow path communicating with the second pressure chamber to one or more wheel cylinders and comprising third and fourth inlet valves; and
    a circuit balance valve configured to open and close a balance flow path connecting the first hydraulic flow path to the second hydraulic flow path,
    wherein the first hydraulic circuit comprises a first balance valve connecting between a first branching flow path having the first inlet valve and a second branching flow path having the second inlet valve, and the second hydraulic circuit comprises a second balance valve connecting between a third branching flow path having the third inlet valve and a fourth branching flow path having the fourth inlet valve.

2. The electric brake system of claim 1, wherein the first and second inlet valves are configured to open and close a flow path between the first hydraulic flow path and the one or more wheel cylinders, the third and fourth valves are configured to open and close a flow path between the second hydraulic flow path and the one or more wheel cylinders, and the circuit balance flow path connects the first hydraulic flow path to the second hydraulic flow path.

3. The electric brake system of claim 2, further comprising:
   a first dump valve configured to open and close a first dump flow path connecting a first reservoir in which oil is accommodated to the first pressure chamber; and
   a second dump valve configured to open and close a second dump path connecting a second reservoir in which oil is accommodated to the second pressure chamber.

4. The electric brake system of claim 3, wherein the first dump valve is configured with a check valve that allows an oil flow only in a direction from the first reservoir to the first pressure chamber, and the second dump valve is configured with a check valve that allows an oil flow only in a direction from the second reservoir to the second pressure chamber.

5. The electric brake system of claim 3, wherein the first dump flow path branches between the first pressure chamber of the first hydraulic flow path and the balance flow path, and the second dump flow path branches between the second pressure chamber of the second hydraulic flow path and the balance flow path.

6. The electric brake system of claim 2, wherein at least one or more of the first hydraulic flow path and the second hydraulic flow path branch into a plurality of flow paths connected to the one or more wheel cylinders, and each of the plurality of branching flow paths include an inlet valve.

7. The electric brake system of claim 1, wherein the first and second branching flow paths branch from the first hydraulic flow path and are respectively connected to two wheel cylinders, and the third and fourth branching flow paths branch from the second hydraulic flow path and respectively connected to two wheel cylinders, and
   wherein the first to fourth inlet valves are configured to open and close each of flow paths between the first to fourth branching flow paths and the wheel cylinders.

8. The electric brake system of claim 7, wherein the first to fourth branching flow paths which branch from the first hydraulic flow path and the second hydraulic flow path include the first to fourth inlet valves, respectively.

9. The electric brake system of claim 1, wherein the circuit balance valve is a normally closed type valve that is usually closed and is opened when an opening signal is received.

10. The electric brake system of claim 1, further comprising:
    a master cylinder connected to a reservoir in which oil is stored and configured to discharge the oil according to a pedal effort of the brake pedal;
    a simulation device connected to the master cylinder, provided with a simulator valve provided at a flow path connecting a simulation chamber in which oil is accommodated to the reservoir in which the oil is stored, and configured to provide a reaction force according to the pedal effort of the brake pedal; and
    an inspection valve configured to open and close a flow path connecting the reservoir to the master cylinder.

11. The electric brake system of claim 10, wherein a check valve is installed at the flow path connecting the reservoir to the master cylinder to allow an oil flow from the reservoir to the master cylinder and block the oil flow from the master cylinder to the reservoir, and the inspection valve is installed at an inspection flow path that bypasses the check valve.

12. The electric brake system of claim 11, wherein the simulator valve is provided to open a flow path connecting the simulation chamber to the reservoir in a normal mode, and to block the flow path connecting the simulation chamber to the reservoir in an abnormal mode, and the inspection valve is provided to block the inspection flow path in an inspection mode.

13. The electric brake system of claim 10, wherein the inspection valve is a normally opened type valve that is usually opened and is closed when a closing signal is received.

14. The electric brake system of claim 1, wherein the first balance valve is connected to downstream of the first and second inlet valves of the first hydraulic circuit and the second balance valve is connected to downstream of the third and fourth inlet valves of the second hydraulic circuit.

15. The electric brake system of claim 1, further comprising:
    a master cylinder connected to a reservoir in which oil is stored and configured to discharge the oil;
    a first cut valve positioned between the master cylinder and downstream of at least one of the first and second inlet valves; and
    a second cut valve positioned between the master cylinder and downstream of at least one of the third and fourth inlet valves.

16. The electric brake system of claim 1, wherein the first branching flow path connects between the first inlet valve and the one or more wheel cylinders, the second branching flow path connects between the second inlet valve and the one or more wheel cylinders, the third branching flow path connects between the third inlet valve and the one or more wheel cylinders, and the fourth branching flow path connects between the fourth inlet valve and the one or more wheel cylinders.

17. The electric brake system of claim 1, wherein the first and second balance valves are normally opened type valve that is closed when a closing signal is received.

* * * * *